United States Patent [19]
Lewis

[11] 4,126,006
[45] Nov. 21, 1978

[54] BOAT DOCK ASSEMBLY
[75] Inventor: Mack A. Lewis, Sioux City, Iowa
[73] Assignee: C. Wilson Persinger, Sioux City, Iowa
[21] Appl. No.: 805,570
[22] Filed: Jun. 10, 1977
[51] Int. Cl.² ............................................. E02B 3/20
[52] U.S. Cl. ................................... 405/220; 52/177; 52/585; 403/298; 405/221
[58] Field of Search ...................... 61/48; 52/177, 585; 403/298, 292

[56]  References Cited
U.S. PATENT DOCUMENTS

| | | | |
|---|---|---|---|
| 2,961,838 | 11/1960 | Vander Wilt | 61/48 |
| 3,043,407 | 7/1962 | Marryatt | 52/177 X |
| 3,081,601 | 3/1963 | Fentiman | 61/48 |
| 3,100,968 | 8/1963 | Bourdon | 61/48 |
| 3,620,027 | 11/1971 | Nordell | 61/48 |
| 3,760,547 | 9/1973 | Brenneman | 403/292 |
| 3,824,796 | 7/1974 | Nasby, Jr. | 61/48 |
| 3,913,291 | 10/1975 | Dulien et al. | 52/177 |
| 4,041,716 | 8/1977 | Thompson | 61/48 |

*Primary Examiner*—Jacob Shapiro
*Attorney, Agent, or Firm*—Clarence A. O'Brien; Harvey B. Jacobson

[57] ABSTRACT

A boat dock assembled from portable sections hingedly connected to each other and provided with foldable and adjustably extensible leg assemblies. Each section is formed from tread retaining decking members made of extruded metal sections interconnected in close parallel spaced relation by interlocking elements. Pivotally separable half-shell foot elements are connected to the leg assemblies for stabilized support of the dock sections.

17 Claims, 18 Drawing Figures

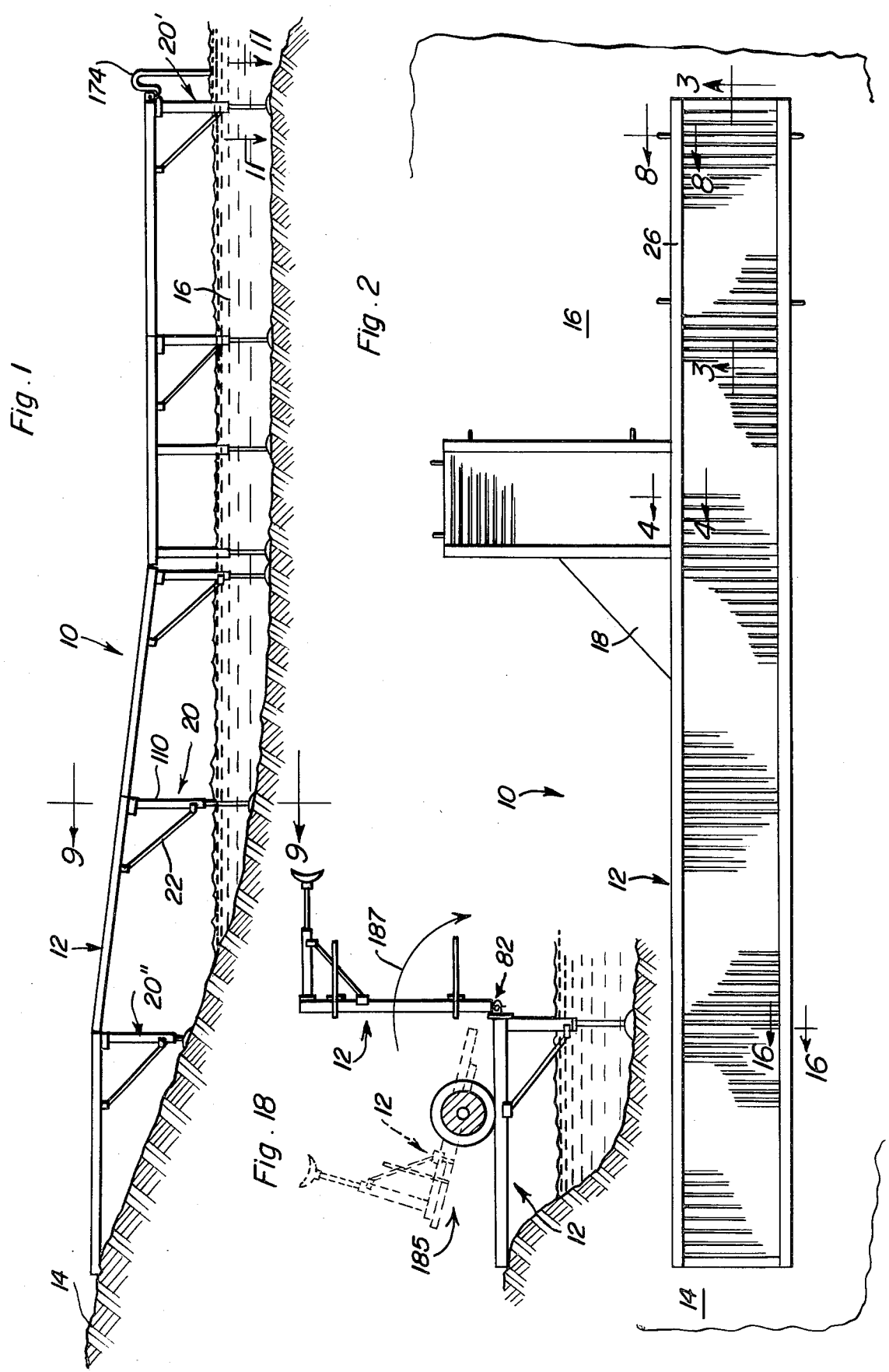

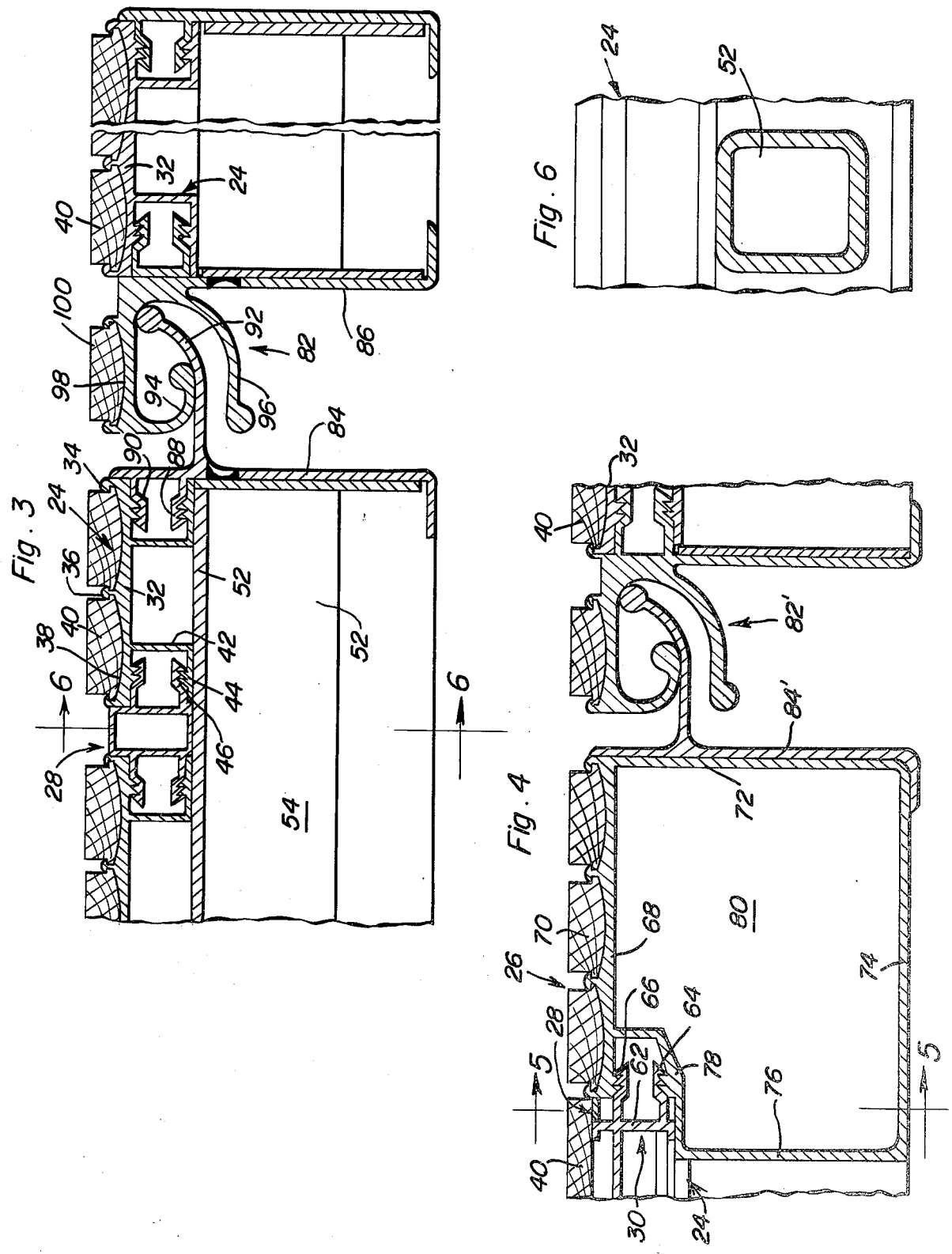

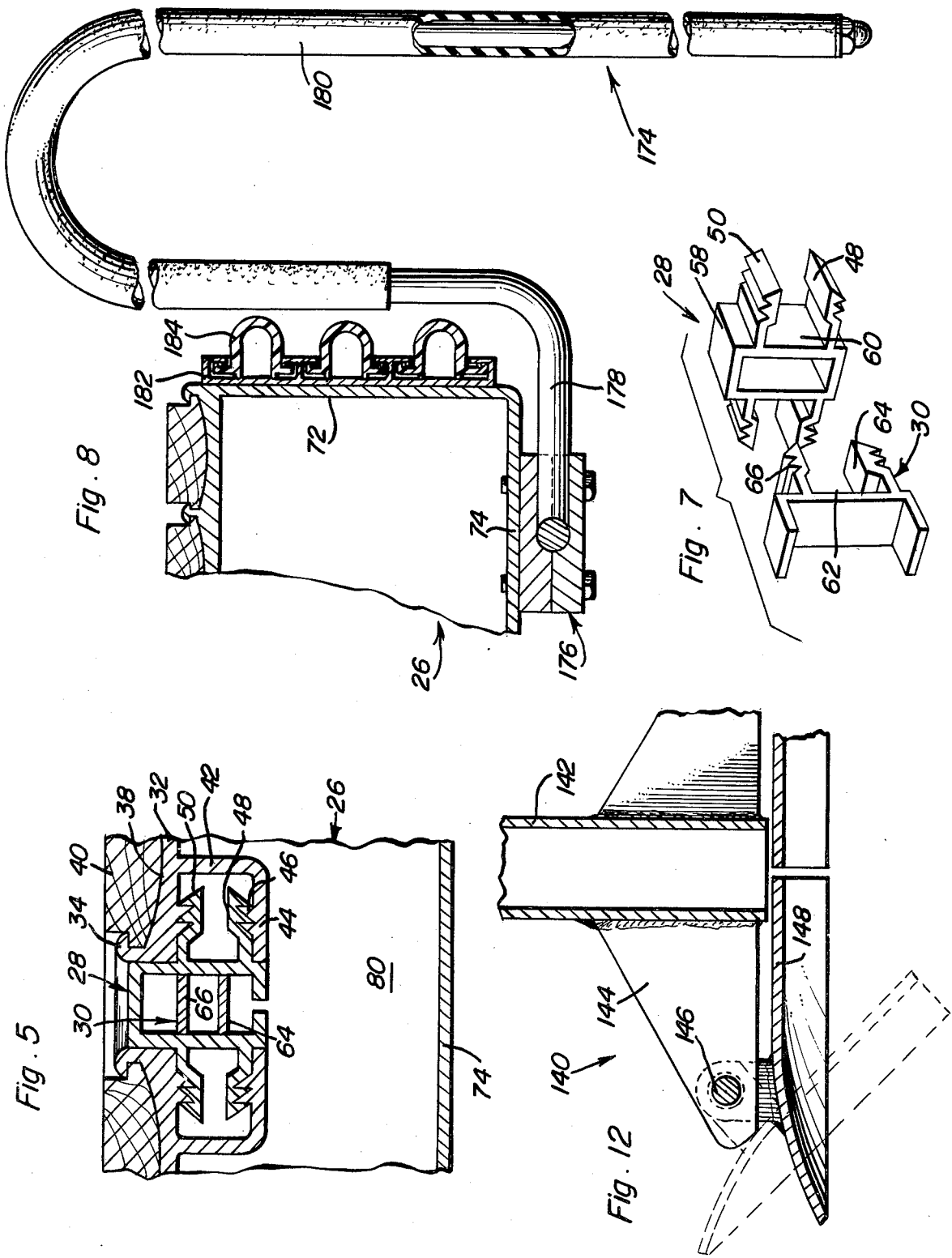

U.S. Patent  Nov. 21, 1978  Sheet 5 of 6  4,126,006
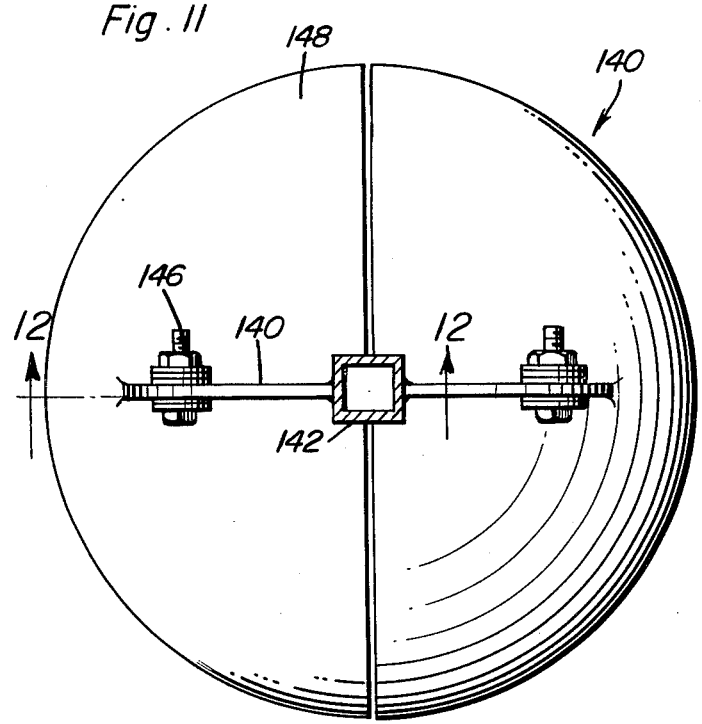
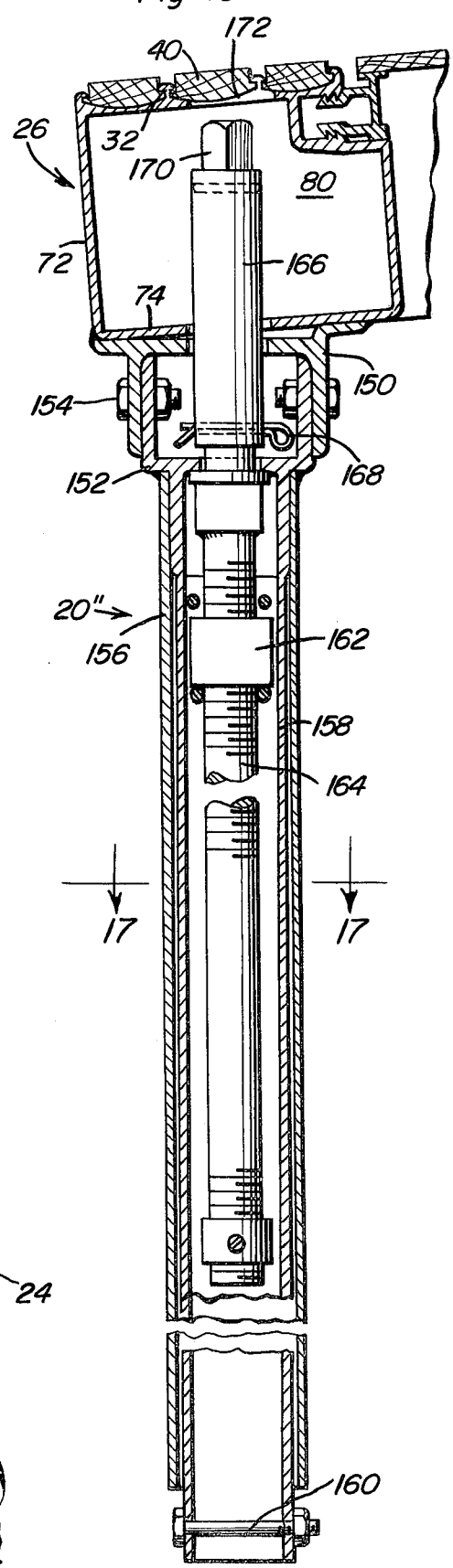
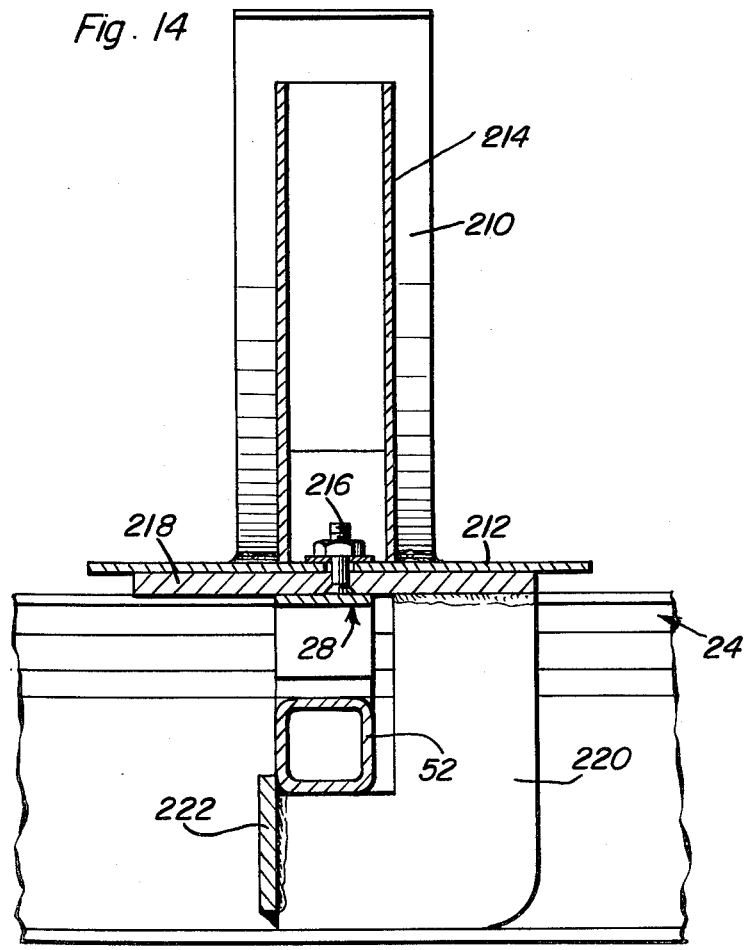

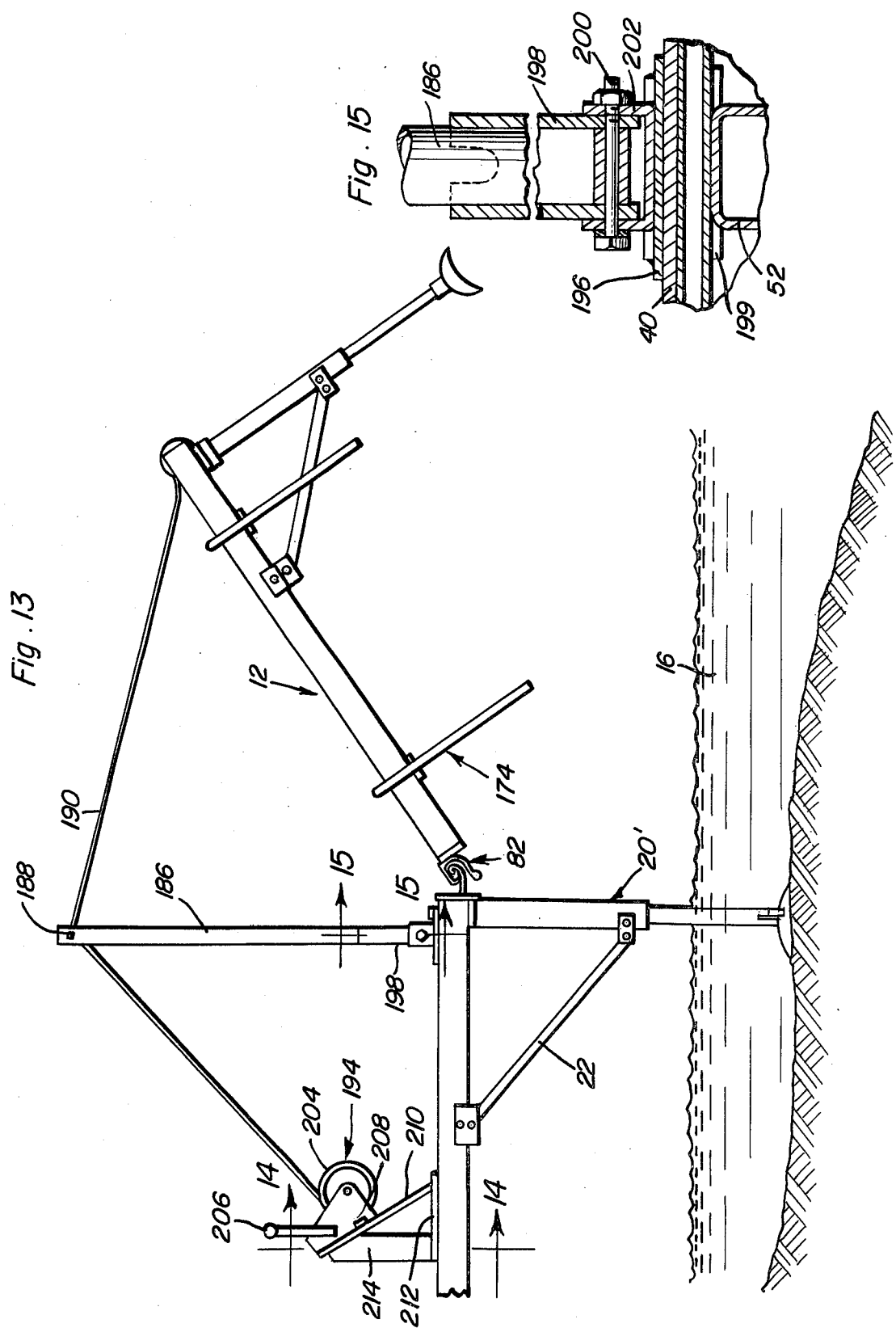

BOAT DOCK ASSEMBLY

BACKGROUND OF THE INVENTION

This invention relates to the construction and installation of boat dock assemblies.

The formation of boat docks from portable sections pivotally interconnected with each other and having foldable and adjustably extensible legs, is well known. Prior U.S. patents relating to such dock assemblies known to applicant consist of U.S. Pat. Nos. 2,948,121, 3,043,109, 3,380,257, 3,568,451, and 3,620,027. Each of such prior art docking arrangements have a limited purpose or utility or a special construction designed to meet certain specific requirements. It is therefore an important object of the present invention to provide an exceptionally versatile method of erecting a boat dock to meet different requirements by use of a plurality of unique portable dock sections that are readily assembled and installed without requiring entry into the water or requiring use of special tools and fasteners.

Another object is to provide a novel construction for portable dock sections made of interchangeable parts assembled without use of fasteners to meet different dimensional requirements.

Yet another object is to provide a dock assembly that may be firmly stabilized in position despite installational variations.

SUMMARY OF THE INVENTION

In accordance with the present invention various docking arrangements are formed from the assembly of portable dock sections interconnected by hinge devices that accommodate up 230° relative angular displacement, each hinge device being concealed below a tread retaining formation substantially bridging the space between the adjacent dock sections above the hinge device. Each dock section is formed by decking members interconnected in close parallel spaced relation by spacer interlock elements having gripping arms engaged with adjacent decking members below upper tread retaining portions thereof. The decking members are interconnected with transversely extending side rail members enclosing liquid retaining chambers or cavities adapted to be filled with water to stabilize the dock assembly after it is installed in place. Hydraulically and/or mechanically adjustable leg assemblies support the dock sections above the water and are provided with pivotally separable clam-like shells as foot elements to form a firm footing as well as to facilitate removal or retraction from any location. The dock sections may be transported to and pivotally assembled in place without entering the water by pivotally lowering each section in sequence into position. By use of a rope and winch arrangement, outer dock sections may be elevated out of the water and disassembled for removal.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevation view of a typical dock arrangement assembled and installed in accordance with the present invention.

FIG. 2 is a top plan view of the dock arrangement shown in FIG. 1.

FIG. 3 is an enlarged partial section view taken substantially through a plane indicated by section line 3—3 in FIG. 2.

FIG. 4 is an enlarged partial section view taken substantially through a plane indicated by section line 4—4 in FIG. 2.

FIG. 5 is a partial section view taken substantially through a plane indicated by section line 5—5 in FIG. 4.

FIG. 6 is a partial section view taken substantially through a plane indicated by section 6—6 in FIG. 3.

FIG. 7 is a perspective view showing disassembled locking elements associated with each of the dock sections forming the dock assembly shown in FIGS. 1 and 2.

FIG. 8 is an enlarged partial section view taken substantially through a plane indicated by section 8—8 in FIG. 2.

FIG. 11 is an enlarged transverse section view taken substantially through a plane indicated by section line 11—11 in FIG. 1.

FIG. 12 is a partial section view taken substantially through a plane indicated by section line 12—12 in FIG. 11.

FIG. 13 is a partial side elevation view showing the removal of a dock section.

FIG. 14 is an enlarged partial section view taken substantially through a plane indicated by section line 14—14 in FIG. 13.

FIG. 15 is an enlarged partial section view taken substantially through a plane indicated by section line 15—15 in FIG. 13.

FIG. 16 is an enlarged partial section view taken substantially through a plane indicated by section line 16—16 in FIG. 2.

FIG. 18 is a partial side elevation view showing the assembly and lowering of a dock section into position.

DETAILED DESCRIPTION OF THE PREFERRED EMBODIMENTS

Figure 9:
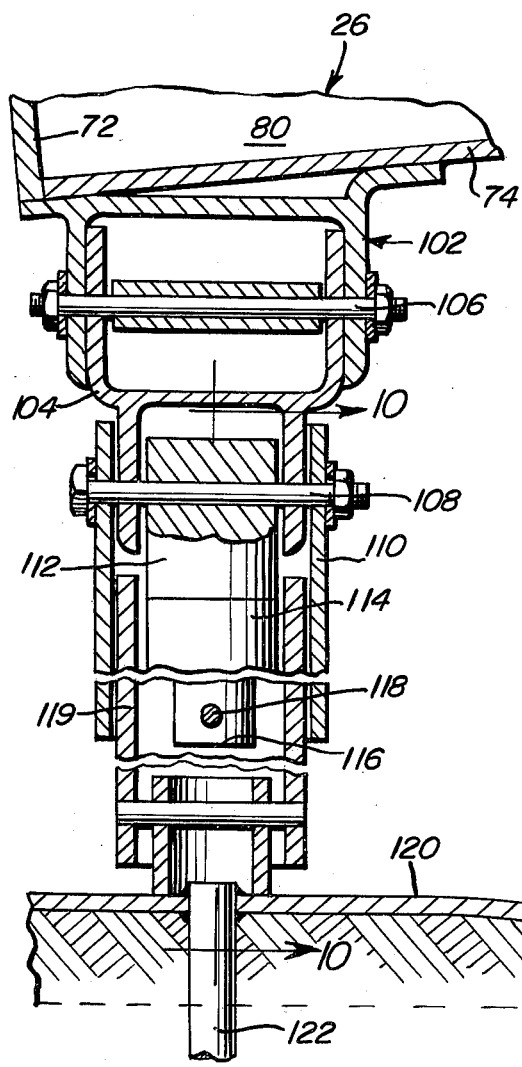
FIG. 9 is an enlarged partial section view taken substantially through a plane indicated by section line 9—9 in FIG. 1.

Referring now to the drawings in detail, FIGS. 1 and 2 illustrate a typical boat dock assembly generally referred to by reference numeral 10. In the arrangement shown, the dock assembly includes five elongated dock sections 12 extending along a straight path, as viewed from above in FIG. 2, from dry land 14 out over a body of water 16. A sixth dock section extends laterally from the side of one of the dock sections over the water and is interconnected therewith by a corner cross walk member 18 as shown in FIG. 2. The dock sections 12 are hingedly interconnected with each other and each has a pair of extensible leg assemblies 20 connected thereto at one longitudinal end as shown in FIGS. 1. A brace 22 is associated with each leg assembly to support the assembled dock assemblies in their elevated positions as shown. It should of course be appreciated that other dock arrangements may be formed by the assembly of different numbers of dock sections 12 to meet different dock requirements.

Referring now to FIGS. 2, 3 and 4 in particular, the construction of a typical dock section 12 will become apparent. Each dock section is assembled from a plurality of parallel spaced decking members 24 interconnected with a pair of side rail members 26. The length and number of decking members may be varied while the side rail members are cut to the length of the dock section. The decking and side rail members thus form the basic components of the dock section and are fabricated as metallic extrusions of uniform and constant cross-section as more clearly seen in FIGS. 3 and 4. Spacer locking elements 28 interconnect adjacent decking members 24 at their longitudinal ends in close parallel spaced relation to each other as shown in FIG. 3 while interlock elements 30 interconnect the decking members 24 with the side rail members 26 at right angles as shown in FIG. 4.

Each decking member 24 as more clearly seen in FIG. 3 includes a tread retaining portion 32 from which a pair of side retainer projections 34 and an intermediate retainer projection 36 extend upwardly alongside of a pair of curved recesses 38 in which a pair of treads 40 are seated, the treads being made of wood, carpeting or some other material presenting a suitable friction surface for walking purposes. A pair of supporting ribs 42 depend from the tread retaining portion 32 from which a pair of grip arms 44 extend at right angles thereto in generally parallel spaced relation below the portion 32. Sawtooth grip formations 46 project toward each other from the grip arms 44 and the tread portion 32 for engagement with mating formations on elastically deflectable arms 48 and 50 associated with one of the spacer locking elements 28 aforementioned as more clearly seen in FIG. 5. The assembled decking members 24 are supported on a tube or support beam 52 which extends substantially the entire length of the dock section so as to structurally rigidify assembly of decking members.

Each spacer locking element 28 as more clearly seen in FIGS. 5 and 7 includes a tubular portion 58 of rectangular cross-section having generally parallel vertical sides 60 from which the grip arms 48 and 50 extend. The locking elements 28 interconnect adjacent decking members at the ends abutting the side rail members 26 as shown in FIG. 4. Each interlock element 30 includes a web 62 from which a pair of elastically deflectable grip arms 64 and 66 extend. The web 62 abuts the rectangular portion 58 of a spacer element 28 with its grip arms projecting therethrough as shown in FIG. 4 so as to engage grip teeth on the abutting side rail member 26 in order to interconnect the assembled decking members with the side rail members.

Each side rail member 26 also includes a tread retaining portion 68 having tread retainer projections for holding three treads 70 as shown in FIG. 4. An outer side 72 interconnects the tread portion 68 with a bottom 74 to which an inner side 76 is connected. The side 76 is connected to the tread portion 68 by a grip receiving portion 78 forming a support ledge for the assembled locking element 28 and 30. The interconnected sides, bottom and portions 68 and 78 of the side rail member also enclose a liquid retaining chamber 80 adapted to be either filled with water or drained. When drained, the side rail members 26 form part of a relatively lightweight dock section capable of being manually carried and assembled in place. Once installed in a dock assembly, the chambers 80 formed in the side rail members 26 may be filled with water to stabilize the assembly.

The dock sections are pivotally interconnected with each other by hinge assemblies 82. As shown in FIG. 3, the adjacent longitudinal ends of the dock sections are closed by end plates 84 and 86 associated with the hinge assembly 82. The end plates are locked to decking members at the ends by grip arms 88 and 90 projecting therefrom. A curved bearing arm 92 projects from plate 84 and is received within a cavity formed between arms 94 and 96 projecting from plate 86 to establish a hinge connection accommodating up to 230° relative angular movement between the adjacent dock sections. The bearing arms 92, 94 and 96 underlie a tread retaining formation formed integrally with the arms 94 and 96 and projecting from plate 86. Thus, the tread 100 will substantially bridge the space between the longitudinal ends of adjacent dock sections occupied by the hinge assembly 82 to protect and conceal the hinge connection. A similar hinge assembly 82' as shown in FIG. 4 interconnects a dock section at one longitudinal end with the side rail member 26 when two dock sections are interconnected at right angles to each other. The hinge assembly 82' is the same as 82 except that plate 84' is secured to side 72 without any grip arms.

Figure 10:
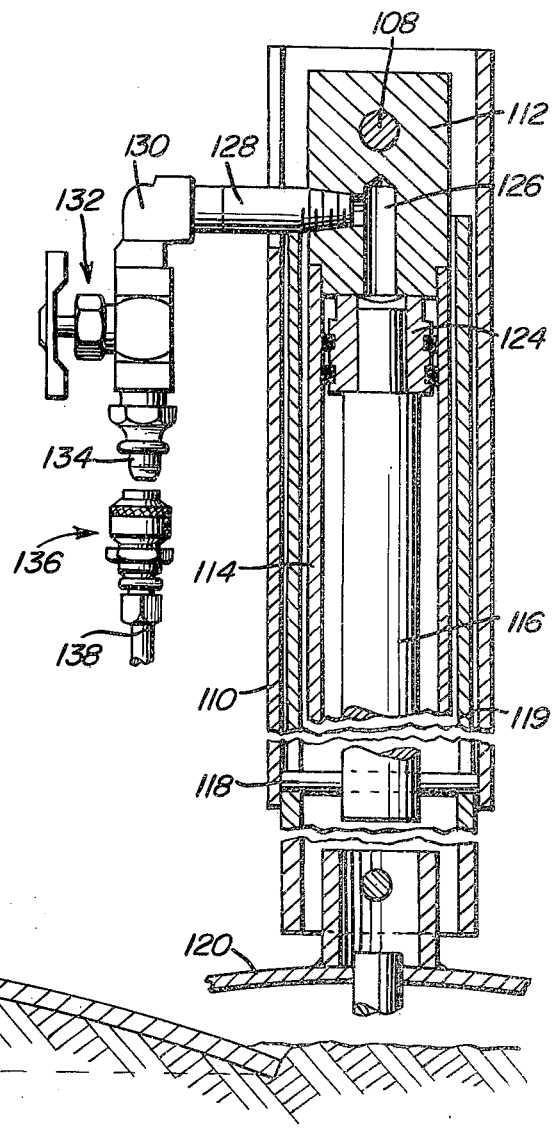
FIG. 10 is an enlarged partial section view taken substantially through a plane indicated by section line 10—10 in FIG. 9.

Each dock section is supported by a pair of leg assemblies 20 as aforementioned. One type of leg assembly 20 shown in FIG. 9 includes a bracket 102 secured to the side rail member to support it at a 5° angle to a plane perpendicular to the vertical axis of the leg assembly. A connector 104 is pivotally connected by pivot bolt 106 to the bracket 102 and is in turn pivotally connected by pivot bolt 108 to an outer tubular housing 110 to which the brace 22 is connected as shown in FIG. 1. The pivot bolt 108 also extends through an upper head 112 from which a hydraulic cylinder 114 is suspended within the housing 110. A piston rod 116 is displaceable from the lower end of cylinder 114 and is connected by pin 118 to a curved foot element 120 through an extensible sleeve 119. On short legs, the foot element 120 may be connected directly to the piston rod through a pin without any sleeve 119. The foot element has an anchor rod 122 connected thereto for insertion into the earth so as to firmly anchor the leg assembly in place. The element 120 provides a sufficiently large bearing surface to resist shifting and tilting of the leg assembly. The piston rod 116 has a piston element 124 connected to the upper end thereof as shown in FIG. 10. Fluid under pressure is supplied to the upper end of the cylinder 114 through a passage 126 in the head 112. The head is therefore connected by conduit section 128 and elbow 130 to a valve 132 having an inlet fitting 134 through which a quick disconnect coupling 136 may connect the valve to a water pump (not shown) through conduit 138. Water drawn from the body of water 16 may therefore be pumped into each leg assembly 20 for extension thereof to a desired length by displacement of the piston element 124 in order to firmly anchor each dock section in place through its foot element 120. To lower a dock section, the valve 132 may be opened to release fluid and shorten the leg assembly.

Leg assemblies 20' supporting some dock sections may be provided with another type of foot assembly 140 as shown in FIGS. 11 and 12. The extensible element 142 of the leg assembly 20' has a pair of connecting wing elements 144 welded to the lower end thereof in alignment with each other. Each wing element 144 is pivotally connected by a pivot pin 146 to a half-shell element 148. The curved shell elements 148 form a clam-like configuration in the solid line position shown in FIG. 12 to provide a firm bearing support for the leg assembly. The shell elements 148 may pivot to the position shown by dotted line in FIG. 12 to facilitate withdrawal of the foot assembly from the earth in which it is embedded when disassembling the dock.

Figure 17:
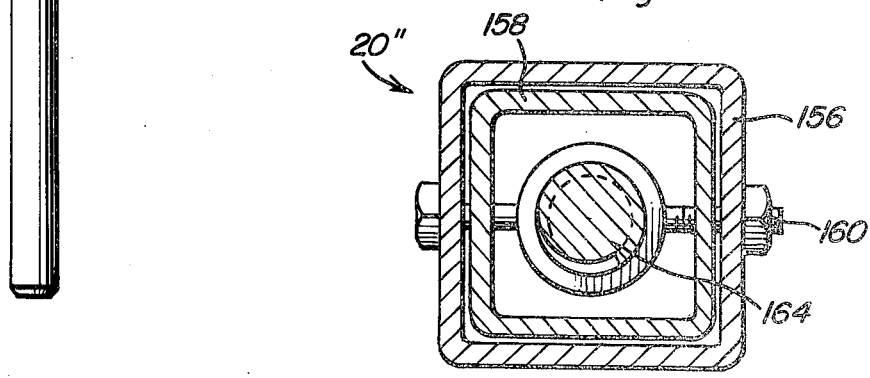
FIG. 17 is an enlarged transverse section view taken substantially through a plane indicated by section line 17—17 in FIG. 16.

FIGS. 16 and 17 show another form of leg assembly 20" which may be utilized for support of some dock sections. The leg assembly 20" is also extensible, but by mechanical means. A bracket 150 is secured as by welding to the bottom 74 of the side rail member 26 associated with the dock section. A connector 152 is connected by a pair of aligned fastener assemblies 154. An outer tubular housing 156 is secured as by welding to the connector 152 and depends therefrom. A tubular extensible element 158 abuts the connector 152 in its fully retracted position as shown in FIG. 16, the lower end of the extensible element 158 being connectible to a foot assembly by means of a connecting bolt 160. An internally threaded nut element 162 is mounted in axially fixed position within the element 158. An elongated screw element 164 threadedly extends through the nut element 162 and is connected at its upper end within connector 152 to an actuating shank 166 by means of a cotter pin 168. The actuator shank extends through aligned openings in the bracket 150 and the bottom 74 of the side rail member into chamber 80 and terminates at its upper end at section 170 adapted to be grasped by a tool for rotation of the screw element 164. Access to actuator section 170 is provided by means of an opening 172 formed in the tread portion 32 of the side rail member. A plug 40 is accordingly removed to expose opening 172 when it is desired to either extend or retract the extensible element 158. Rotation of the screw elememt 164 causes axial displacement of the nut 162 and the element 158 axially fixed thereto.

Some of the dock sections are provided with bumper assemblies generally referred to by reference numeral 174 in FIGS. 1 and 8. Each bumper assembly includes a clamp assembly 176 secured to the bottom 74 of the side rail member 26 as shown in FIG. 8, the clamp assembly being operative to detachably anchor the end portion of a curved bumper rod element 178 that extends outwardly and upwardly in spaced relation to the side rail member and then curves downwardly. The portion of the bumper rod 178 spaced outwardly from the side rail member is covered with a suitable impact absorbing material 180. The outer side 72 of the side rail member 26 may also have secured thereto a retainer bracket 182 holding a plurality of parallel bumper ribs 184 in order to provide impact protection for the dock section between the bumper assemblies 174.

FIG. 18 illustrates the manner in which a dock section 12 is added onto a previously anchored dock section when assembling a dock assembly. The disassembled dock section as shown by dotted line is transported by a wheeled cart 185 to the end of the anchored dock section and is hooked onto it to form the hinge assembly 82 by tilting the cart. The hingedly assembled dock section is then lowered into the water by pivotal displacement thereof off the cart as shown by arrow 187 in FIG. 18.

FIG. 13 illustrates the manner in which a dock section 12 is removed. A gin pole 186 is secured to the longitudinal end portion of an anchored dock section so as to position thereabove a guide 188 for a rope 190 connected at one end to the dock section being raised out of the water. The other end of the rope 190 extends from a manually operated winch assembly 194 detachably secured to the previously anchored dock section. As more clearly seen in FIG. 15, the gin pole 186 is received at its lower end within a sleeve 198, which is connected by a bolt assembly 200 to a mounting bracket 202 welded to a bearing plate 196 resting on the treads 40 of the dock section. A pair of prongs 199 welded to the plate 196 depend therefrom between adjacent decking members 24 in straddling relation to the support tube 52. The winch assembly 194 aforementioned includes a rope sheave 204 on which the rope 190 is wound or unwound, the sheave being rotated by means of a crank handle 206 interconnected with the sheave through suitable gearing (not shown). The sheave and gearing are mounted by means of a bracket 208 secured to a rearwardly inclined support plate 210. The support plate 210 is secured to a base plate 212 and support post 214. As more clearly seen in FIG. 14, the base plate 212 is secured by a fastener assembly 216 to an anchor plate 218 that rests on top of the decking members 24. A vertical L-shaped anchor fin 220 is secured as by welding to the anchor plate 218 and depends therefrom between the adjacent decking members and is held assembled in place by a lower element 222 to embrace the support tube 52. Thus, the winch assembly 194 may be firmly anchored in place for performing its function.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a dock adapted to be assembled from a plurality of sections, pivotal means interconnecting adjacent sections of the dock in spaced relation to each other and tread retaining means connected to one of the adjacent sections in overlying relation to the hinge means for substantially bridging the adjacent sections of the dock, each of said sections including a plurality of decking members and spacer means interconnecting said decking members in close parallel spaced relation to each other, each of said decking members comprising an elongated rigid extrusion having a floor portion, at least one supporting rib depending from the floor portion, at least two tread retaining formations projecting upwardly from the floor portion and gripping means formed in underlying relation to the floor portion for receiving the spacer means.

2. In combination with the dock defined in claim 1, each of said sections further including a side rail member and locking means extending through said spacer means for interconnecting the side rail and decking members in transverse relation to each other.

3. The combination of claim 2 wherein said side rail member encloses a liquid retaining chamber adapted to be filled with water, whereby each section may be stabilized after assembly and installation of the dock.

4. The combination of claim 2 wherein said spacer means includes a plurality of interlock elements interconnecting the decking members in abutting relation to the side rail member, each of said interlock elements comprising a split tubular spacing portion and elastically deflectable latch arms projecting from the spacing portion into engagement with the gripping means of the decking members.

5. The combination of claim 4 wherein said locking means comprises a plurality of latching elements, each of said latching elements comprising a web portion abutting the spacing portion of one of the interlock elements between the decking members interconnected thereby, and elastically deflectable latching arms projecting from the web portion through said spacing portion into engagement with the gripping means of the side rail member.

6. The combination of claim 5 wherein said hinge means includes end plate members secured to adjacent sections and having elastically deflectable arms projecting therefrom into engagement with the gripping means of the decking or side rail members of the adjacent sections, and curved interengaging formations extending from said end plate members into assembled relation to each other to accommodate up to 230° relative angular displacement of the adjacent sections.

7. The combination of claim 6 including a plurality of longitudinally adjustable leg assemblies connected to each of said sections, and an anchoring foot device connected to each of said leg assemblies, said anchoring foot device including a pair of shell elements, and means pivotally connecting said shell elements to the leg assembly in spaced relation to each other for displacement between a closed position forming a continuous concave curvature and an open position.

8. The combination of claim 1 wherein said spacer means includes a plurality of interlock elements interconnecting the decking members in abutting relation to the side rail member, each of said interlock elements comprising a tubular spacing portion and elastically deflectable latch arms projecting from the spacing portion into engagement with the gripping means of the decking members.

9. The combination of claim 8 wherein said locking means comprises a plurality of latching elements, each of said latching elements comprising a web portion abutting the spacing portion of one of the interlock elements between the decking members interconnected thereby, and elastically deflectable latching arms projecting from the web portion through said spacing portion into engagement with the gripping means of the side rail member.

10. The combination of claim 1 including a plurality of longitudinally adjustable leg assemblies connected to each of said sections, and an anchoring foot device connected to each of said leg assemblies, said anchoring foot device including a pair of shell elements, and means pivotally connecting said shell elements to the leg assembly in spaced relation to each other for displacement between a closed position forming a continuous concave curvature and an open position.

11. The combination of claim 1 wherein said hinge means includes end plate members secured to adjacent sections and having elastically deflectable arms projecting therefrom into engagement with the gripping means of the decking members of the adjacent sections, and curved interengaging formations extending from said end plate members into assembled relation to each other to accommodate up to 230° relative angular displacement of the adjacent sections.

12. The combination of claim 1 wherein said spacer means includes a plurality of interlock elements interconnecting the decking members, each of said interlock elements comprising a tubular spacing portion and elastically deflectable latch arms projecting from the spacing portion into engagement with the gripping means of the decking members.

13. In dock adapted to be assembled from a plurality of sections, each of said sections including a side rail member and plurality of decking members, spacer means interconnecting said decking members in close parallel spaced relation to each other, locking means extending through said spacer means for interconnecting the side rail and decking members in transverse relation to each other, hinge means pivotally interconnecting adjacent sections of the dock spaced from each other by a gap and tread retaining means connected to one of the adjacent sections in overlying relation to the hinge means for substantially bridging the gap between the adjacent sections of the dock.

14. The combination of claim 13 wherein said hinge means includes end plate members secured to adjacent sections and having elastically deflectable arms projecting therefrom into engagement with the gripping means of the decking or side rail members of the adjacent sections, and curved interengaging formations extending from said end plate members into assembled relation to each other to accommodate up to 230° relative angular displacement of the adjacent sections.

15. In a dock adapted to be assembled from a plurality of sections, hinge means pivotally interconnecting adjacent sections of the dock spaced from each other by a gap for relative angular displacement of the adjacent sections in assembled relation by up to approximately 230 degrees, and tread retaining means connected to one of the adjacent sections in overlying relation to the hinge means for substantially bridging the gap between the adjacent sections of the dock.

16. In a dock adapted to be assembled from a plurality of sections and an elongated support beam, each of said sections including a plurality of decking members and spacer means interconnecting said decking members independently of the support beam in close parallel spaced relation to each other, each of said decking members comprising an elongated rigid extrusion having a floor portion, at least one supporting rib depending from the floor portion into contact with the support beam, at least two tread retaining formations projecting upwardly from the floor portion and gripping means formed in underlying relation to the floor portion for receiving the spacer means above the support beam.

17. In a dock adapted to be assembled from a plurality of sections, a plurality of longitudinally adjustable leg assemblies connected to each of said sections, and an anchoring foot device connected to each of said leg assemblies adapted to be embedded in earth to anchor the dock, said anchoring foot device including a pair of shell elements, and means pivotally connecting said shell elements to the leg assembly in spaced relation to each other for displacement between a closed position forming a continuous concave curvature and an open position facilitating withdrawal of the foot device from the earth.

* * * * *